UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

METHOD OF PRESERVING INFUSIBLE PHENOLIC CONDENSATION PRODUCTS FROM DISCOLORATION AFTER PRESERVING.

1,345,695. Specification of Letters Patent. Patented July 6, 1920.

No Drawing. Application filed July 24, 1919. Serial No. 312,971.

*To all whom it may concern:*

Be it known that we, LAWRENCE V. REDMAN, a citizen of Canada, residing in Evanston, Cook county, Illinois, and ARCHIE J. WEITH and FRANK P. BROCK, citizens of the United States, and residing in Chicago, in the county of Cook and State of Illinois, have invented a new and useful Improvement in Methods of Preserving Infusible Phenolic Condensation Products from Discoloration after Preserving, of which the following is a specification.

This invention relates particularly to a method of preserving from discoloration hard, resistant, infusible phenolic condensation products. Such an infusible, phenolic condensation product may be obtained by condensing a phenolic body and an active methylene substance, applying heat, or heat and pressure, to effect the condensation. Where formaldehyde, or a polymer thereof, is employed as the methylene substance, the reaction may be facilitated, if desired, by the use of a suitable catalyst. Thus, one may employ a suitable base, salt, or acid, preferably in small proportion, as a catalyzing or condensing agent. Where hexamethylenetetramin is employed as the methylene substance, no catalyst is necessary or desirable; and, indeed, it is unnecessary to use a catalyst even where the formaldehyde process is employed for producing the phenolic condensation product.

Processes for producing hard, resistant and infusible condensation products by both the formaldehyde process and the hexamethylenetetramin process are now well known in the art. Where the phenolic body and active methylene substance are employed in such proportions as to afford substantially one methylene group to each phenolic group, or a slight excess of the methylene radical, a very hard and resistant phenolic condensation product may be obtained by the known processes, using suitable precautions, such products being infusible and substantially insoluble in the usual solvents, such as alcohol, acetone, or the like, and highly resistant to the action of caustic alkalies. If some moderate excess of phenol be used, the product may still be hard, resistant, and infusible, but the degree of hardness will be lessened somewhat and the product will be less resistant to the solvents and caustic alkalies.

In the manufacture of such articles as pipe-stems, cigarette-holders, and cigar-holders, it is usual to employ a transparent, infusible, condensation product which is hard and to a very high degree insoluble in the usual solvents, although the product will be affected to some extent in such solvents as alcohol and acetone and still more readily in hot caustic alkalies. For the purpose of the present application such a product, as well as the hardest and most resistant product will be referred to as infusible and practically insoluble.

Such a transparent product may be produced, using phenol proper, or a phenolic body composed of pure phenol and comprising one or more of the homologues of phenol. Examples of the production of such a transparent condensation product by both the formaldehyde process and the hexamethylenetetramin process are given, for illustration, in our pending United States application No. 254,371, filed September 16, 1918. The natural color of such product is a golden amber yellow. This is particularly true where some nitrogen, even in very slight amount, is present in the manufacture of the product. It is true where hexamethylenetetramin is employed in the manufacture, and it is true where formaldehyde is employed in the manufacture with a basic condensing agent containing nitrogen, such as ammonia. It is not uncommon to introduce into the compound a very small amount of auramin dye to insure a deep amber color. This may be accomplished by using the dye in extremely small proportion.

While the transparent product possesses a beautiful color after it has become infusible and practically insoluble, and such product has, for a number of years, been employed in the manufacture of transparent articles, a very large industry being based thereon, this industry has, nevertheless, been greatly handicapped by the fact that the condensation product changes from a uniform golden amber yellow to a varying brownish color when exposed to bright light in the air. This change occurs without any appreciable deterioration of the qualities of the product, except with respect to the very important matter of appearance.

The primary object of the present invention is to preserve the appearance of the transparent product, and especially of manufactured articles composed of the transparent product.

We have discovered that the discoloration of the product occurs as a result of the exposure of the product to bright light in a gaseous medium which is not inert, and, on the other hand, if the product be maintained in a medium which is inert, the product may be exposed, with immunity, to the brightest sunlight, and the discoloration will not occur.

The gist of the invention, or discovery, therefore, is the method of preservation against discoloration, which consists in maintaining an infusible phenolic condensation product which is hard and strongly resistant to solvents, or a manufactured article composed thereof, in an inert medium which will not substantially affect such product when exposed to the sunlight or other bright light.

The method may be carried out in a variety of ways. The most simple and most easily practised, perhaps, is to inclose the article in a vessel containing an inert gas. This gas may be at atmospheric pressure, or may be under pressure above atmospheric pressure, or may be under reduced pressure. The vessel should be closed, so as to be practically air-tight. If the medium employed be an inert gas at atmospheric pressure, there is little difficulty in preventing diffusion of the gas with the atmosphere and vice versa, even though the vessel be not hermetically sealed.

As an illustration of the difficulty heretofore experienced with these transparent phenolic condensation products, we may state that such articles as cigarette-holders, cigar-holders, and pipes composed either partly or wholly of the transparent product are commonly placed on display in windows, in order to attract custom; and because of the discoloration which occurs when these articles are displayed in a window for some time, many of the articles must be sold, as seconds, at a reduced price. Thus, in the aggregate, very large losses occur. On the other hand, if the article be sold while it still possesses its beautiful color, it may be carried in the pocket, and under the ordinary conditions of usage will retain its attractive appearance for a long period of time. If exposed, while in the air, to bright light for any considerable length of time, the discoloration will occur, however. The bad effect, in such case, probably is due to the combined action of the light and the free or active oxygen in the air. That is, the free or active oxygen in the air will attack the condensation product if it be exposed at the same time to the sunlight, or to other bright light.

A good example of an inert gas which will serve effectively as a medium for preserving the color of the condensation product is carbon dioxid ($CO_2$). If a vessel is filled with this inert gas and the condensation product articles are placed in the vessel, and the vessel be closed or sealed, the beautiful color of the articles will be maintained indefinitely, even though exposed to bright sunlight. The gas may simply displace the air in the vessel, and there will be practically no tendency to diffusion, if the vessel be closed tightly, even without hermetically sealing the vessel. Another example of an inert gas which is suitable is nitrogen. Methane, or natural gas, ($CH_4$) will answer the purpose, as will also ordinary illuminating gas. It is preferred, however, to use a gas which is non-explosive and non-odorous.

Instead of filling the closed vessel with an inert gas of some such character as indicated by the illustrations given, the vessel may be rendered vacuous. That is, a vacuum may be employed. In such case, the vacuum must be high enough to substantially eliminate the air, so that there will remain in the medium an insignificant amount of oxygen or other active gas. Vacuums of from $\frac{1}{4}$ to $\frac{3}{4}$ of a milimeter have been found satisfactory. A somewhat lower vacuum may be used, but in such case a very slight discoloration may occur.

A condensation product of the character referred to above is substantially anhydrous as well as infusible and practically insoluble, if made in accordance with preferred processes. Such a product is suitable to manufacture into various articles. By providing a method for preventing discoloration of manufactured articles until they are put into use, large losses may be prevented in connection with such articles as cigar-holders, cigarette-holders and the like. In addition to this, however, the field for the use of this class of product will be enlarged, because it will be practicable to employ the condensation product still more largely in the arts, including the replacement of amber, coral or the like.

It is practicable to employ the method herein described in connection with window display cases or receptacles. Such cases or receptacles may have the walls composed wholly or largely of glass; and, if tightly sealed and containing an inert medium, the articles may remain therein for an indefinite period, exposed to bright sunlight, without discoloration. The manufactured articles may also be kept in sealed glass retainers, containing an inert medium, on the counters or shelves of stores, the articles being taken from one container, after another, as required.

The most usual color employed in the transparent condensation product is a golden amber yellow, or a clear light amber, or fine lemon color. Such a product is free from fillers, which are employed for cheapening purposes, or for modifying the qualities, such as are ordinarily used in molding compounds. The transparent products are sometimes modified in color, without sacrificing the pleasing effect. For instance, one may introduce during the manufacture of the condensation product and before the material is poured into the molds, auramin, to produce a deep amber yellow; methyl violet, to produce amethyst; acetyl red, to produce "dregs of wine," etc. These coloring materials may be used in small quantities and need not exceed from 1 to 1½ per cent. of the mass. Oils and waxes may be employed in small proportions to produce oqaque materials; and ground mica or fish-scales may be employed to produce a shimmering effect. In any case, these products, being of the transparent order, may be advantageously preserved against discoloration in accordance with the method herein described.

The foregoing detailed description has been given for clearness of understanding only and no unnecessary limitation should be understood therefrom, but the appended claims should be construed as broadly as permissible, in view of the prior art.

What we regard as new, and desire to secure by Letters Patent, is:

1. The method of preserving an infusible and practically insoluble phenolic condensation product of the transparent order from discoloration which consists in maintaining such product in a medium which is inert with respect thereto when exposed to the action of sunlight.

2. The method of preserving a manufactured article composed of a hard and resistant infusible phenolic condensation product from discoloration which consists in maintaining such article in a receptacle filled with an inert gas which will not substantially attack the article in the presence of light.

3. The method of preserving an infusible and practically insoluble condensation product of the transparent order from discoloration which consists in maintaining the product in a vessel from which free oxygen is substantially excluded.

LAWRENCE V. REDMAN.
ARCHIE J. WEITH.
FRANK P. BROCK.